(12) United States Patent
Clark

(10) Patent No.: US 6,484,812 B1
(45) Date of Patent: Nov. 26, 2002

(54) HARROW BEARING

(75) Inventor: Russell K. Clark, Edmonton (CA)

(73) Assignee: Phoenix Rotary Equipment Ltd., Edmonton (CA)

( * ) Notice: Subject to any disclaimer, the term of this patent is extended or adjusted under 35 U.S.C. 154(b) by 0 days.

(21) Appl. No.: 09/700,487

(22) PCT Filed: May 17, 1999

(86) PCT No.: PCT/CA99/00445

§ 371 (c)(1),
(2), (4) Date: Feb. 8, 2001

(87) PCT Pub. No.: WO99/59395

PCT Pub. Date: Nov. 25, 1999

(30) Foreign Application Priority Data

May 19, 1998 (CA) ............................................. 2237875

(51) Int. Cl.⁷ .............................................. A01B 71/04
(52) U.S. Cl. ...................... 172/540; 172/658; 172/682; 172/714; 172/776; 384/157
(58) Field of Search .................. 172/540, 545, 172/548, 549, 550, 575, 574, 518, 602, 657, 658, 682, 714, 715, 749, 750, 776, 21; 384/91, 129, 157, 428

(56) References Cited

U.S. PATENT DOCUMENTS

| | | | |
|---|---|---|---|
| 2,615,219 A | 10/1952 | McCleneghan, Jr. | |
| 2,618,518 A | 11/1952 | Haltom | |
| 3,212,585 A | 10/1965 | Bezzerides | |
| 3,650,334 A | 3/1972 | Hagenstad | |
| 5,000,270 A | * 3/1991 | Phillips | ...................... 172/540 |

FOREIGN PATENT DOCUMENTS

WO    WO95 07605    3/1995

* cited by examiner

Primary Examiner—Christopher J. Novosad
(74) Attorney, Agent, or Firm—Bennett Jones LLP

(57) ABSTRACT

A bearing assembly (10) is taught including a housing (14), a shaft (18) supported within the housing (14) and having an outboard end extending through an opening in an end of the housing (14), a bearing (16) disposed between the shaft (18) and the housing (14) to permit rotation of the shaft (18) within the housing (14); and a harrow engaging member (20), such as a pair of diametrically opposed protrusions or a pair of apertured plates, mounted on the housing (14) and positioned either a) diametrically adjacent the bearing or b) between the bearing and the outboard end of the shaft. A harrow including the bearing assembly (10) is also taught.

14 Claims, 4 Drawing Sheets

HARROW BEARING

FIELD OF THE INVENTION

This invention is directed to a harrow bearing assembly and a harrow including a bearing assembly.

BACKGROUND OF THE INVENTION

Harrows are used for breaking up and levelling soil during a soil cultivation operation. One type of harrow, a rotary spike harrow, is an elongated tool with a ground working portion having spikes extending therefrom. A rotary spike harrow is described in U.S. Pat. No. 5,000,270 of L. C. Phillips. The harrow of Phillips is formed of a plurality of interconnected tool elements forming an elongate chain-like structure, termed herein the ground working portion of the harrow. The ends of the ground working portion are connected to a support frame in such a way as to enable the chain-like structure to rotate about its long axis. The harrow generally includes a rotatable bearing assembly, such as a shaft supported in a bearing, to permit rotation of the ground working portion about its long axis.

In previous rotary spike harrows, the rotatable bearing assembly is connected between the ground working portion and the frame. In these harrows, a space measuring about one foot in length is left between the frame and the first, end spikes on the ground working portion. Thus, in the simultaneous use of more than one section of rotary spike harrow for cultivation of large expanses of soil, it is required that the harrow sections be mounted behind the tractor in a tiered in an partially overlapping manner to avoid leaving a strip of uncultivated soil between each adjacent section. In particular, where harrow sections are used in end to end relation, without overlapping, a strip of uncultivated soil is left after a pass of the harrow. The strip corresponds to the space between the ground working portions of adjacent harrows. Additionally in previous harrows, the bearing assemblies are open and, therefore, susceptible to damage by collisions with objects, such as rocks, on the ground surface which is being cultivated.

SUMMARY OF THE INVENTION

A harrow bearing assembly has been invented which is relatively resistant to damage during use. The harrow bearing reduces the space between the ground working portion of the harrow and the frame on which the ground working portion is mounted.

In accordance with a broad aspect of the present invention, there is provided a bearing assembly comprising a housing, a shaft supported within the housing and having an end extending through an opening in an end of the housing, a bearing disposed between the shaft and the housing to permit rotation of the shaft within the housing; and a harrow ground working portion engaging means positioned on the housing either a) diametrically adjacent the bearing or b) between the bearing and the end of the shaft extending from the housing.

The bearing can be any suitable means for supporting and permitting rotation of the shaft relative to the housing, as would be understood by a person skilled in the art. In one embodiment, the bearing includes at least one race of ball bearings in a standard bearing ring. The bearing is selected to withstand the forces applied thereto when connected to a harrow. To enhance the accommodation of lateral forces on the shaft, the bearing preferably includes at least one bearing, such as a tapered roller bearing, suited for accommodating such forces. The bearing is disposed within the housing. Preferably, the housing is sealed to prevent debris from entering the housing and from coming into contact with the bearing means.

The shaft is selected to withstand the forces applied thereto when used in a harrow. Preferably, the shaft is formed of steel. In one embodiment, an end of the shaft opposite the housing is formed, for example, to include an eye, for attachment to a harrow support frame. The eye can be formed from the material of the shaft or can be formed separately and attached thereto. In another embodiment, the shaft is formed integral with a harrow support frame.

The harrow ground working portion engaging means are any suitable means for retaining the ground working portion of a harrow thereon. The ground working portion engaging means are positioned on the housing of the bearing means. The engaging means are formed integral with (ie. as by casting), or alternatively secured (i.e. as by welding), to the housing. The engaging means can be any suitable means provided that they are positioned in one of a) diametrically adjacent the bearing and b) between the bearing and the end of the shaft extending from the housing. In other words, the engaging means are positioned to engage the ground working portion of the harrow such that the ground working portion extends to overlap with at least a portion of the bearing. This arrangement shortens the length of the harrow over previous harrows, since the bearing and a portion of the housing is positioned within the length of the ground working portion. The arrangement also provides protection for the more delicate components, including the housing and the bearing, of the bearing assembly. The components of the ground working portion are more durable than the bearing housing and the bearing contained therein and, therefore, are more able to accommodate collisions with objects without critical damage thereto.

In one embodiment, the harrow ground working portion engaging means is a weld between the ground working portion and the housing. In another embodiment, the harrow ground working portion engaging means is a flange about the open end of the housing including, for example, protrusions or hooks for engaging an end of the harrow, apertures for accepting fasteners such as, for example, wire or bolts connecting between the bearing housing and the ground working portion of the harrow or other means.

The bearing assembly is particularly suited for use with a rotary spike harrow of the type having a ground working portion which includes a plurality of interconnected tool elements. Each tool element is formed to be substantially U-shaped and includes a pair of spikes extending from a loop portion which spans the spikes. The ground working portion of the harrow is formed as a series of groups of tool elements. Each group includes at least two tool elements arranged to define a central space therebetween. Each group of tool elements is releasably hooked to the adjacent group to form flexible connections therebetween. Tensioning the harrow along its longitudinal axis ensures that the groups of tool elements remain hooked together. When under tension, the arms of the tool elements extend out to form the ground working spikes of the harrow. Thus, preferably, the bearing assembly of the present invention is formed to engage this ground working portion of the harrow and has harrow ground working portion engaging means including hooks to engage the loop portions of the tool elements, apertures for accepting bolts to engage the spikes of the tool elements or a combination of hooks and apertures.

In accordance with another broad aspect of the present invention, there is provided a harrow comprising: a ground working portion including a plurality of tool elements arranged in a series of groups, each group of tool elements being hooked together with its adjacent group of tool elements to form flexible connections between the groups, each group formed of at least two tool elements disposed to define a central space therebetween and each tool element including a loop portion and a pair of spikes extending from the loop portion; a bearing assembly engaged at each end of the ground working portion, at least one bearing assembly including a housing, a shaft supported within the housing and having an end extending through an opening in an end of the housing, a bearing disposed between the shaft and the housing to permit rotation of the shaft within the housing, the at least one bearing assembly being engaged to the end of the ground working portion such that the bearing is positioned within the central group of tool elements and the shaft extends out from the central space at the end of the ground working portion.

The harrow can be mounted onto a frame. The shafts of the bearing assemblies are secured onto the frame in any suitable way, such that the ground working portion can rotate with the bearing housing about the shafts. The frame is selected to maintain the ground working portion under tension.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings.

DETAILED DESCRIPTION OF THE PRESENT INVENTION

Figure 1:
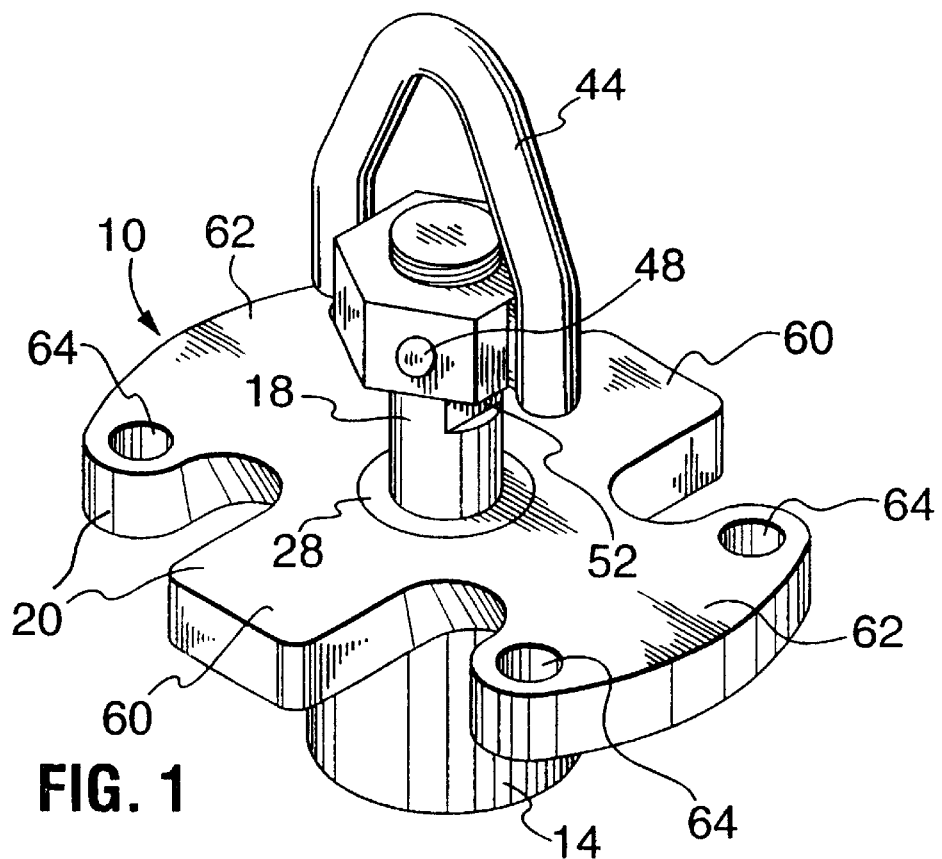
FIG. 1 is a perspective view of a bearing assembly according to the present invention.
Figure 2:
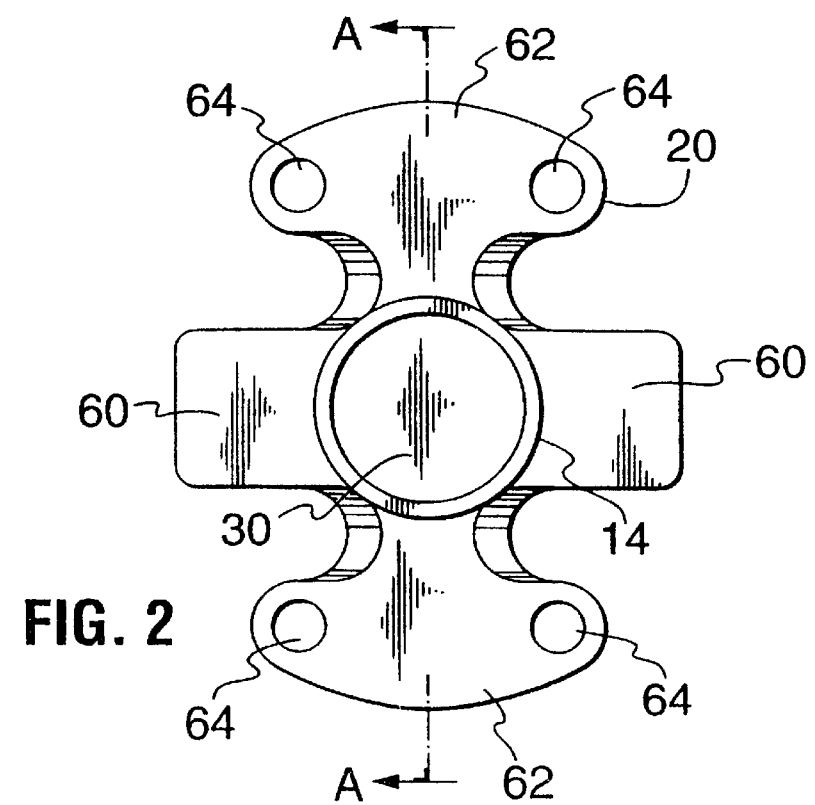
FIG. 2 is a plan view of the bearing end of the bearing assembly of FIG. 1.
Figure 3:
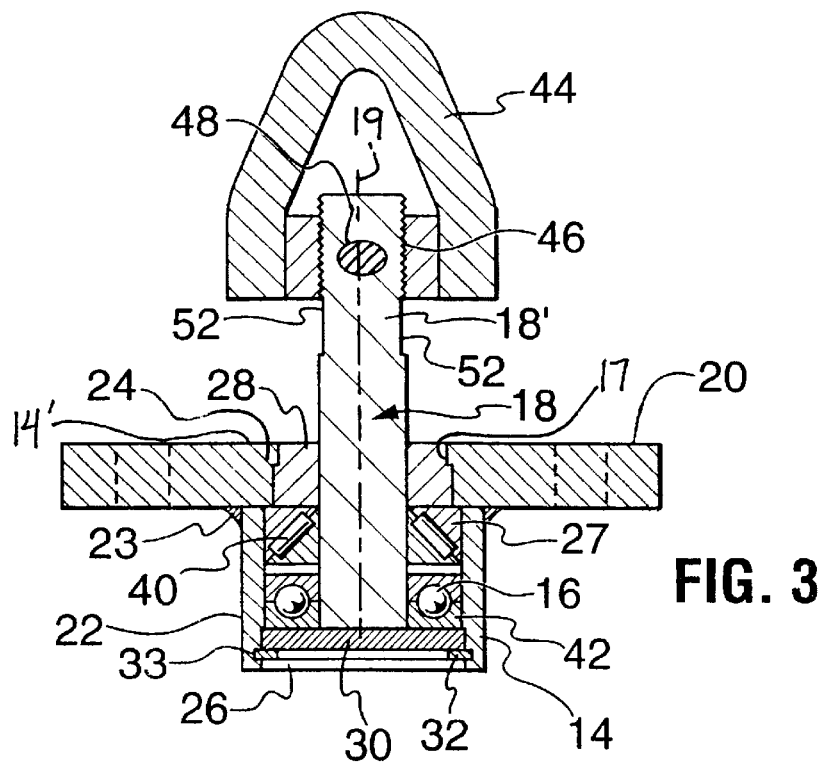
FIG. 3 is a sectional view along line A—A of FIG. 2.

Referring to FIGS. 1 to 5, a bearing assembly 10 according to the present invention is shown. The bearing assembly is particularly suited for attachment to a ground working portion 12 of a rotary spike harrow, as will be described in detail hereinafter.

Bearing assembly 10 includes a bearing housing 14 disposed about a bearing 16, a shaft 18 supported by and rotatable about its long axis 19 and within housing 14 as facilitated by bearing 16. Shaft 18 extends out through an opening 17 in end 14' of the housing. A flange 20 supporting means for engaging the ground working portion of a harrow is positioned about end 14' of the housing. Flange 20 is positioned between bearing 16 and the outboard end 18' of shaft 18 which extends from housing 14.

The housing contains the components of the bearing. The housing is selected to be sealed against entry of debris. In the embodiment as shown, the housing is formed of a base cylindrical section 22 and, attached thereto by welds 23, a top section 24. In the illustrated embodiment, flange 20 is formed integral with top section 24.

A bore 26 is formed through the housing. The diameter of bore 26 in top section 24 is reduced when compared to the diameter of the bore in base cylindrical section 22. A tapered bearing cone 27, preferably formed of steel, is disposed in bore 26. Housing 14 further includes bushing 28, preferably formed of polymeric material such as nylon or Teflon™ press fit in bore 26 of top section 24 and an end plate 30 secured in place by a lock ring 32 engaged in a groove 33. Preferably, housing 14 is formed from round steel tubing, except where indicated. It is to be understood that housing 14 can be constructed in other ways and from other materials, as would be appreciated by a person skilled in the art. In an alternative embodiment, for example, cylindrical section 22 can be formed integral with section 24. In another alternate embodiment, end plate 30 is secured to housing by a pin or by welding. Use of welding, however, complicates repair and/or replacement of the inner components of bearing 16.

The bearing can be any suitable arrangement for supporting and permitting rotation of the shaft relative to the housing. In the illustrated embodiment, bearing 16 includes a tapered roller bearing 40 and a straight bearing ring 42. The outer diameter of bearings 40 and 42 are selected to be just less than the diameter of bore 26 of the housing such that bearing 16 can be fit with close tolerance into housing 14.

Figure 6:
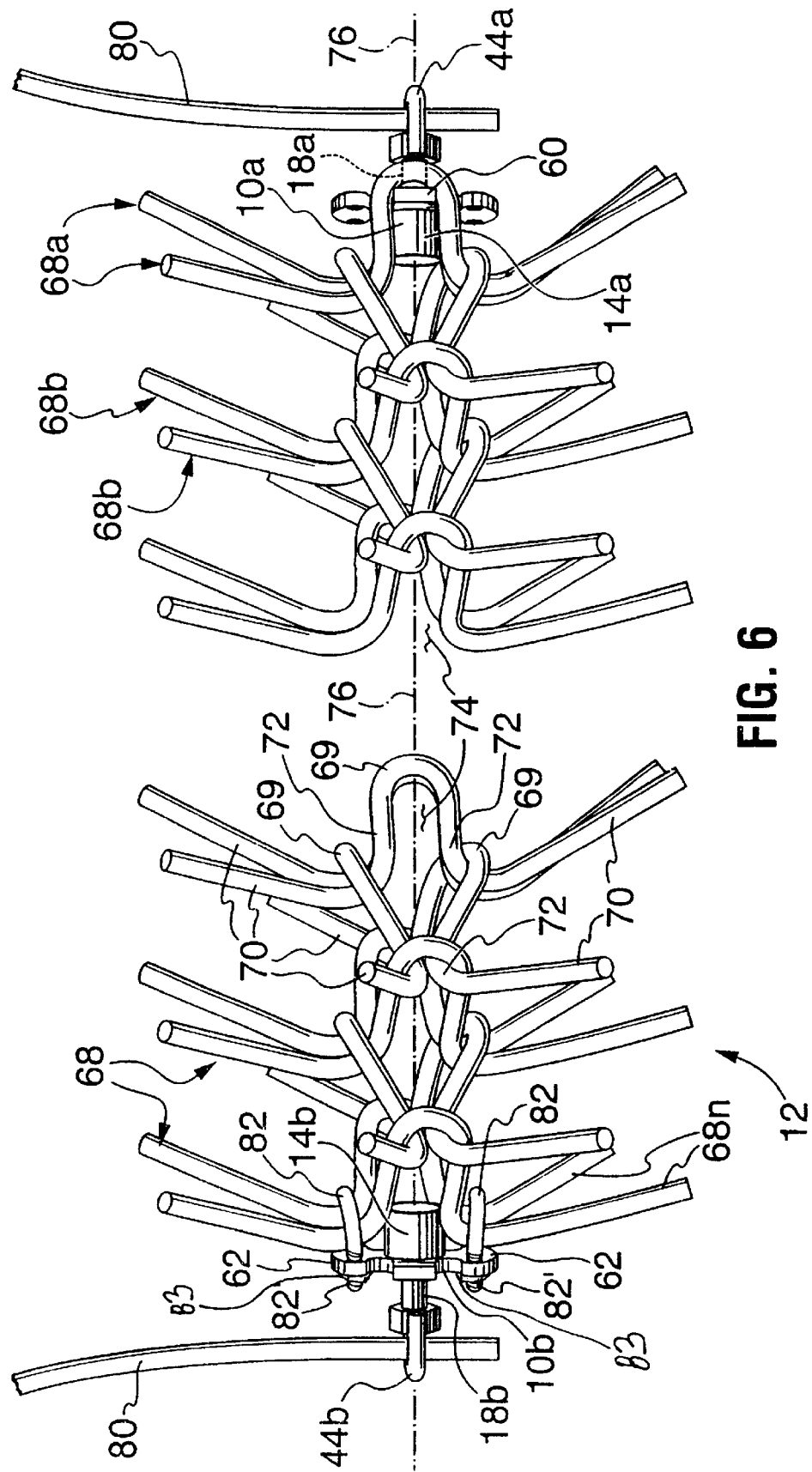
FIG. 6 is a side elevation view of a harrow according to the present invention; and, FIG. 7 is a schematic representation of a sectional view through another bearing assembly according to the present invention.

Bearings 40 and 42 are secured, as by press fitting, about shaft 18. End 18' extends out of housing 14 though bushing 28. Shaft 18 is selected to withstand the forces applied thereto when in use and, preferably, is formed of steel. An eye 44 is mounted on shaft 18 for connection to a frame arm 80 of a harrow support frame (FIG. 6). Preferably, eye 44 is mounted on shaft 18 by threaded engagement onto a threaded portion 46 of the shaft and is maintained in place by insertion of a pin 48 through alignable apertures on eye 44 and shaft 18. Wrench flats 52 are preferably provided on shaft 18 to provide for tightening the eye onto the shaft. As would be understood, alternately, the eye can be formed integral with the shaft or the eye can be omitted and other means for attachment to a frame can be used. In another embodiment, the shaft is formed integral with the frame or the structure to which the shaft is to be attached and, therefore, the eye, or other means for attachment, is not required.

Flange 20 supports harrow ground working portion engaging means and is positioned between bearing 16 and outboard end 18' of shaft. The illustrated bearing assembly is intended for use with a harrow of the type having interconnected tool elements. Thus, the harrow ground working portion engaging means includes a pair of diametrically opposed protrusions 60 extending out from housing 14 and a pair of diametrically opposed apertured plates 62. The engaging means can take other forms. For example, where a more permanent connection between the bearing assembly and the ground working portion is acceptable, the engaging means can be, for example, welds. However, the protrusions and the apertured plates are preferred as they permit removal of the bearing assembly for replacement and/or repair and permit a degree of pivotal movement at the connection between the bearing assembly and the ground working portion.

The functioning of protrusions 60 and apertured plates 62 is best understood with reference to FIG. 6. As noted hereinbefore, a preferred type of harrow in which the bearing assembly is used includes a ground working portion 12 formed of a plurality of interconnected tool elements 68. Each tool element is generally U-shaped including a loop portion 69 and a pair of spikes 70 extending from the loop portion. A hooked portion 72 is provided along the length of each spike. The ground working portion of the harrow is formed as a series of groups, shown as 68a, 68b... 68n, of tool elements. Each group includes two tool elements arranged to form therebetween a central space, generally indicated as 74. Each group of tool elements is releasably hooked to the adjacent group to form flexible connections therebetween. In particular, the loop 69 of one tool element is hooked over the aligned hooked portions 72 of the tool elements in the next adjacent group of tool elements. Tensioning the ground working portion of the harrow along its longitudinal axis, indicated as 76, ensures that the groups of tool elements remain hooked together. When under tension, the spikes 70 of the tool elements extend out to form the ground working spikes of the harrow. Preferably, no connectors are provided between the tool elements of the ground working portion.

A bearing assembly 10a, 10b is attached at each end of ground working portion 12. The bearing assemblies permit the ground working portion of the harrow to rotate about its longitudinal axis 76. The bearing assemblies are attached to the ground working portion of the harrow such that the shafts 18a, 18b of the bearing assemblies 1a, 10b extend out from the ends of the assembled harrow for attachment to a pair of frame arms 80 of a harrow support frame. The bearing assemblies are attached to the harrow support frame through their respective eyes 44a, 44b. This arrangement provides that the bearings (not shown) within bearing housings 14a, 14b are positioned in the central space 74 within the end groups 68a and 68n of tool elements.

It is inherent in the construction of the ground working portion that the group 68a of tool elements at one end of the ground working portion 12 has their loop portions 69 extending at the end, while at the other end the group 68n of tool elements has their hooks 72 and spikes 70 extending out. Thus, the bearing assembly 10a at the first end is connected to the ground working portion 12 through loop portions 69 of group 68a of tool elements. In particular, loop portions 69 of the tool elements are hooked over protrusions 60. When the ground working portion is not under tension, the tool elements of group 68a can freely pivot about their connection to the next adjacent group 68b and, therefore, the placement of the loop portions 69 over the protrusions 60 can be easily accomplished. The length and shape of the protrusions, as well as their angular orientation relative to the shaft, must be selected to engage the loop portions of the end tool elements. Protrusions 60 preferably extend out substantially orthogonally relative to shaft 18. It is to be understood, however, that protrusions 60 could be curved as hooks or be formed in other ways to engage the ground working portion. Because of the length of the protrusions and their angular orientation relative to the shaft, once the bearing is engaged to the ground working tool and both are placed under tension, it is virtually impossible to remove the loops from the protrusions.

Figure 4:
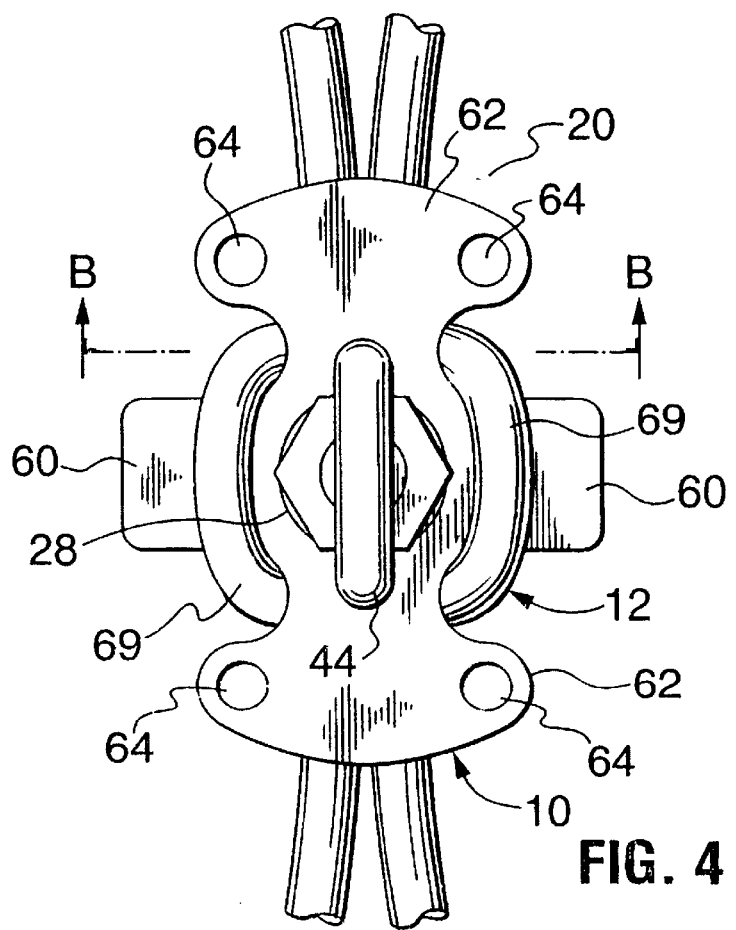
FIG. 4 is a plan view of the shaft end of the bearing assembly of FIG. 1 with a ground working portion of a harrow engaged on the bearing assembly.
Figure 5:
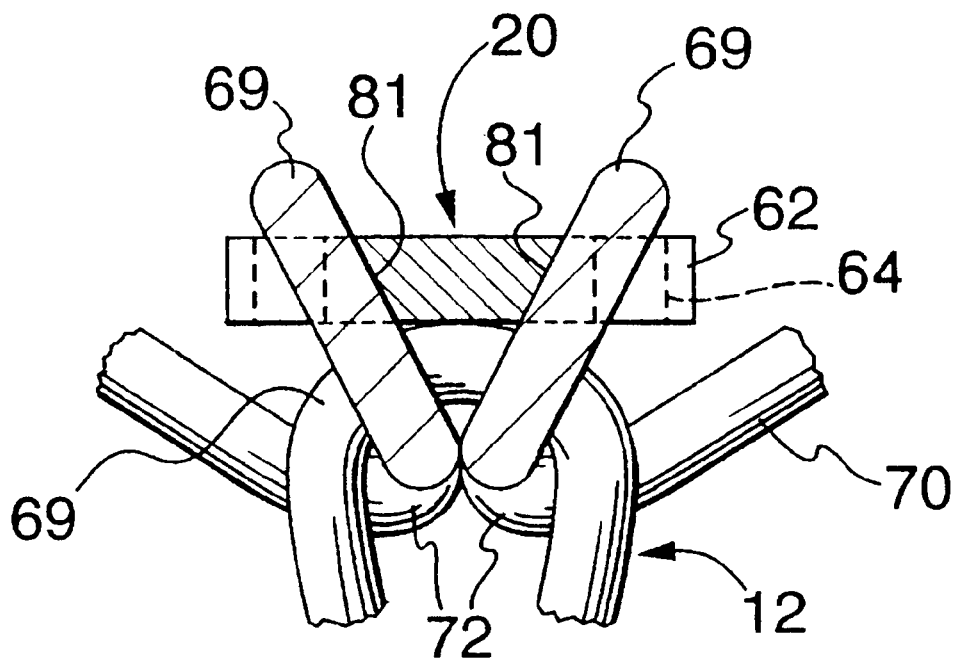
FIG. 5 is a sectional view along line B—B of FIG. 4.

The attachment of the loops 69 of a pair of tool elements to bearing 1a is shown in greater detail in FIGS. 4 and 5. To facilitate engagement of the loops 69 to the protrusions, preferably flange 20 is bevelled, as shown at 81, to accommodate the angled orientation of the loops as they pass over the protrusions. Bevelling is not necessary where apertured plates 62 are omitted from between protrusions 60.

The bearing assembly 10b is engaged at the opposite end of ground working portion 12 by use of apertured plates 62. Apertured plates 62 each have a pair of apertures 64 formed thereon. The apertures are spaced a selected distance to accommodate the arms of a U-bolt 82. In particular, U-bolt 82 is positioned to engage the tool elements of group 68n. Each U-bolt 82 is inserted over one spike 70 of each tool element in the group or, preferably as shown, each U-bolt 82 is inserted over one hook portion 72 of each tool element of the group and the threaded ends 82' of bolts 82 are inserted through the apertures 64 of the apertured plates 62. Nuts 83 are threaded over ends 82' of the bolts to secure them in place.

Protrusions 60 engage one end of the ground working portion, while apertured plates 62 are used in engaging the other end of the ground working portion. Since the pair of protrusions 60 and the pair of apertured plates 62 each function only at one end, the bearing assembly can be made with only a selected one of the pair of protrusions or the pair of apertured plates. However, to facilitate manufacture and use, preferably, each bearing assembly is provided with both of these harrow ground working portion engaging means. The engaging means can be formed integral with housing 14, as shown. Alternately, the harrow engaging means can be formed separately and secured, as by welding, to the housing of the bearing means.

Once the assembled harrow is positioned between the frame arms 80, the frame arms can be driven apart, as is known, to put the harrow under tension along its longitudinal axis. The harrow is then ready for use in the cultivation of soil. The distance between the ground working portion 12 and each frame arm 80 is determined by the combined length of the eye and the extending end of the shaft. This distance is greatly reduced over systems using conventional harrow bearings wherein the distance is increased by the length of the bearing housing. The harrow of the present invention is also resistant to damage to the bearing, since the bearing is protected within the end groups of tool elements.

Figure 7:
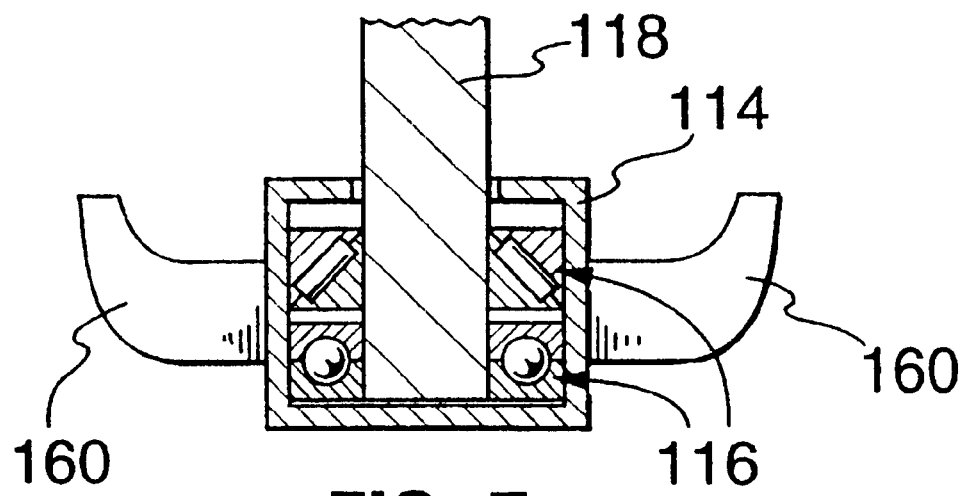

In another bearing assembly according to the present invention, as shown schematically in FIG. 7, the harrow ground working portion engaging means are in the form of hooks 160. The hooks are mounted on housing 114 and positioned substantially diametrically adjacent bearings 116. This bearing assembly is similar to the embodiment of FIG. 1 in that the more delicate bearing components are protected within the central space of a group of tool elements. A harrow including the bearing assembly of FIG. 7, will be of a reduced length when compared to a harrow having a ground working portion of the same length but having a bearing assembly with the entirety of the bearing housing extending beyond the length of the ground working portion.

It will be apparent that many other changes may be made to the illustrative embodiments, while falling within the scope of the invention and it is intended that all such changes be covered by the claims appended hereto.

What is claimed is:

1. A harrow comprising:
    a ground working portion including a plurality of tool elements arranged in a series of groups, each group of tool elements being hooked together with its adjacent group of tool elements to form flexible connections between the groups, each group formed of at least two tool elements defining therebetween a central space along a longitudinal axis and each tool element including a loop portion and a pair of spikes extending from the loop portion; and a bearing assembly engaged at each end of the ground working portion, at least one of the bearing assemblies including a housing, a shaft supported within the housing and having an outboard end extending through an opening in an end of the housing, a bearing disposed between the shaft and the housing to permit rotation of the shaft within the housing, the at least one bearing assembly being engaged to the end of the ground working portion by a pivotally rmoveable connection formed to permit a degree of pivotal movement between the bearing assembly and the ground working portion and the bearing being positioned within the central space of a group of tool elements with the outboard end of the shaft extending out from the end of the ground working portion.

2. The harrow of claim 1 wherein the harrow is mounted through the shaft of the bearing assembly onto a frame such that the ground working portion can rotate with the bearing assembly housing about the shaft.

3. The harrow of claim 2 further comprising an eye at the outboard end of the shaft for hooking the bearing assembly onto the frame.

4. The harrow of claim 1 wherein the pivotally moveable connection is a pair of diametrically opposed protrusions extending out from the housing, the loop portion of a tool element being hooked over each protrusion to secure the ground working portion to the bearing assembly housing.

5. The harrow of claim 1 wherein the pivotally moveable connection is a pair of diametrically opposed apertured plates extending out from the housing and a U-shaped member secured onto each apertured plate and positioned to engage the one of the spikes of two tool elements.

6. A harrow comprising:

a ground working portion including a plurality of tool elements arranged in a series of groups, each group of tool elements being hooked together with its adjacent group of tool elements to form flexible connections between the groups, each group formed of at least two tool elements defining therebetween a central space along a longitudinal axis and each tool element including a loop portion and a pair of spikes extending from the loop portion;

a bearing assembly engaged at each end of the ground working portion, the bearing assemblies each including a housing, a shaft supported within the housing and having an outboard end, the outboard end extending out through an opening in an end of the housing, a bearing disposed between the shaft and the housing to permit rotation of the shaft within the housing, the bearing assemblies being engaged to the ends of the ground working portion by a pivotally moveable connection to permit a degree of pivotal movement at the connection between the bearing assembly housing and the ground working portion and the bearing being positioned within the central space of a group of tool elements with the outboard end of the shaft extending out from the end of the ground working portion; and a support frame including a first arm and a second arm spaced from the first arm, the first arm engaging the shaft of the bearing assembly at a first end of the ground working portion and the second arm engaging the shaft of the bearing assembly at the opposite end of the ground working portion and the first arm and the second arm being drivable apart to hold the ground working portion under tension along its length.

7. The harrow of claim 6, wherein the bearing assembly at the first end of the ground working portion further includes an eye at the outboard end of the shaft for hooking the bearing assembly onto the first arm of the support frame.

8. A bearing assembly comprising:

a housing;

a shaft supported within the housing and having an outboard end extending through an opening in an end of the housing;

a bearing member disposed between the shaft and the housing to permit rotation of the shaft within the housing, the bearing member having an inner end and an outer end, the outer end being adjacent the opening in the end of the housing and the inner end being opposite the outer end; and a harrow ground working portion engaging means extending out from the housing and positioned between the inner and of the bearing member and the outboard end of the shaft, the harrow ground working portion engaging means including a pair of diametrically opposed protrusions and a pair of diametrically opposed apertured plates.

9. The bearing assembly of claim 8 wherein the pair of diametrically opposed protrusions extend substantially orthogonally relative to the shaft.

10. The bearing assembly of claim 8 wherein the outboard end of the shaft includes an eye.

11. A rotary spike harrow comprising:

a ground working portion including a plurality of tool elements arranged in a series of groups, each group of tool elements being hooked together with its adjacent group of tool elements to form flexible connections between the groups, each group formed of at least two tool elements defining therebetween a central space along a longitudinal axis and each tool element including a loop portion and a pair of spikes extending from the loop portion; and a bearing assembly engaged at each end of the ground working portion, the bearing assemblies each including a housing, a shaft supported within the housing and having an outboard end extending through an opening in an end of the housing, a bearing member disposed between the shaft and the housing to permit rotation of the shaft within the housing, the bearing having an inner end and an outer end, the outer end being adjacent the opening in the end of the housing and the inner end being opposite the outer end, and a harrow ground working portion engaging means for engaging the ground working portion, the harrow ground working portion engaging means of at least one of the bearing assemblies extending out from the housing and positioned between the inner end of the bearing member and the outboard end of the shaft and the harrow ground working portion engaging means including a pair of diametrically opposed protrusions each for accepting the loop portion of a tool element to secure the ground working portion to the bearing and a pair of diametrically opposed apertured plates extending out from the housing and a member secured onto each apertured plate and positioned to engage the one of the spikes of two tool elements.

12. The rotary spike harrow of claim 11 wherein the pair of diametrically opposed protrusions extend substantially orthogonally relative to the shaft.

13. The rotary spike harrow of claim 11 wherein it is mounted through the shafts of the bearing assemblies onto a frame such that the ground working portion can rotate with the bearing assembly housing about the shafts.

14. The rotary spike harrow of claim 13 further comprising an eye at the outboard end of the shaft for hooking the bearing assembly onto the frame.

* * * * *